United States Patent [19]

Hesterman

[11] Patent Number: 4,748,634
[45] Date of Patent: May 31, 1988

[54] PUMPING SYSTEM FOR RF EXCITED GAS DEVICES

[75] Inventor: John W. Hesterman, Fallbrook, Calif.

[73] Assignee: Hughes Aircraft Company, Los Angeles, Calif.

[21] Appl. No.: 28,526

[22] Filed: Mar. 20, 1987

[51] Int. Cl.4 ............................................. H01S 3/097
[52] U.S. Cl. ........................................ 372/82; 372/38; 315/248
[58] Field of Search ............................ 372/38, 81, 82; 315/248; 331/116 R, 179

[56] References Cited
U.S. PATENT DOCUMENTS 2,531,103 11/1950 Beckwith ............................ 339/179
4,169,251 9/1979 Laakmann ...................... 331/94.5 G
4,383,203 5/1983 Stanley ................................ 315/248
4,451,766 5/1984 Angle et al. ........................ 315/248
4,631,449 12/1986 Peters, Jr. ............................ 315/205

FOREIGN PATENT DOCUMENTS 1093538 10/1964 United Kingdom ................ 332/179

Primary Examiner—James W. Davie
Assistant Examiner—B. Randolph
Attorney, Agent, or Firm—Joseph E. Szabo; Anthony W. Karambelas

[57] ABSTRACT

An RF excited gas discharge laser (10) is operated by an RF exciting power supply (12,14) having a frequency established at the selected pumping frequency of the laser. This pumping frequency is displaced from the resonant frequency of the laser itself and is provided via an impedance matching circuit (16) from the output of a high power amplifier (14) to which is fed the relatively low power output of the RF oscillator (12) of the power supply. The required starting voltage, of magnitude greater than the magnitude of the laser running voltage, is provided to ignite the laser by momentarily shifting the frequency of the RF oscillator to a frequency substantially the same as the resonant frequency of the laser and shifting the oscillator frequency back to its normal pumping frequency after laser ignition.

16 Claims, 1 Drawing Sheet

PUMPING SYSTEM FOR RF EXCITED GAS DEVICES

BACKGROUND OF THE INVENTION

1. Field of the Invention

This invention relates to laser systems and more specifically concerns a laser power supply of reduced starting power.

2. Description of Related Art

Power supplies for high pressure gas lasers often employ a radio frequency or RF pumping signal generating system having a frequency established at the desired laser excitation or pumping frequency. Examples of such radio frequency excitation systems are shown in the U.S. Patent to Laakmann, U.S. Pat. No. 4,169,251, and the U.S. Patent to Angle, et al, U.S. Pat. No. 4,451,766.

The gas laser, like other gas discharge devices, requires a much higher starting voltage for ignition of the cold laser than is required for the normal operation or running. Prior art power sources have relied on fixed element impedance matching circuits that have been adjusted to provide a compromise between the impedance match best for applying a high starting voltage to the cold gas discharge device and the impedance match required for efficient, steady operation. Such compromise circuits can be optimized for neither starting nor efficient running. As a proposed solution to this limitation, and in an attempt to provide an RF power supply that provides a high voltage for starting and also an impedance match between the power supply and the gaseous medium of the laser for high efficiency of energy transfer during steady state operation, the above identified patent to Angle, et al, provides a variable impedance matching circuit. In this arrangement, change in impedance of the laser cavity is sensed, and the sensed change used to vary impedance of the matching circuit. This circuit may require continuous adjustment of the radio frequency source. Further, in some applications, variations in impedance of the gas discharge device, the laser, may produce significant unwanted variations in the radio frequency. For example, RF excited gas lasers usually operate at 40.68 MHz owing to FCC requirements on RF emission. Variation of the RF excitation to change laser output power may produce up to 0.5 MHz frequency change, resulting in violation of FCC emission regulations. Further, in certain military systems not subject to FCC regulations, laser drive frequency may be restricted to prevent detrimental interference with other system components.

Still another limitation of a system such as that of the Angle, et al patent, is the fact that the variable component impedance matching circuit necessarily operates on the high power output of the power supply. As power levels increase, it becomes more and more difficult to obtain circuit elements which can be appropriately varied for providing the desired variable impedance matching. Required high power components are less stable and more costly. Thus, while the system of the Angle, et al patent may be applicable for RF amplifiers in the power range of about 50 watts, it is much more difficult to apply the system to higher power amplifiers, those of up to about 300 watts and higher, for example.

Although improved efficiency is obtained in the prior patent of Angle, et al, the system still requires high power RF supplies, capable of handling the very high power required for igniting the laser.

Accordingly, it is an object of the present invention to reduce required starting power of a laser and to avoid or minimize above-mentioned problems.

SUMMARY OF THE INVENTION

In carrying out principles of the present invention, in accordance with a preferred embodiment thereof, a power supply is provided having a normal running frequency at the laser pumping frequency, which is displaced from the resonant frequency of the laser. For increasing starting power, frequency of the power supply is shifted to be at or nearly at the laser resonant frequency to thereby provide a greatly increased voltage. After ignition, the power supply frequency is shifted back to its normal running frequency. More specifically, the power supply includes an RF oscillator which, in a presently preferred embodiment, has a frequency controlling crystal providing an oscillator output at the selected pumping frequency of the operating laser. The oscillator output is fed through a power amplifier and then applied to excite the laser via an impedance matching circuit that is established to optimize the impedance matching at the laser pumping frequency. In an expository embodiment the frequency of the oscillator, and therefore the exciting frequency provided by the RF power supply, is momentarily changed for igniting the laser by momentarily changing the effective frequency of the frequency determining crystal to the laser resonant frequency to provide a large transient voltage for laser ignition. After ignition the frequency controlling crystal shifts back to its normal operating frequency.

DESCRIPTION OF A PREFERRED EMBODIMENT

A preferred embodiment of the present invention which is described herein employs the fact that a gas discharge device, such as an RF excited gas laser, has a natural resonant frequency, but is excited at an operating or pumping frequency that is displaced from the resonant frequency. The operating frequency is displaced from the resonant frequency in order to protect adjacent circuit elements from excessive current and heat that are experienced if the device is run at resonance for a long period of time. The RF power supply, operating at the normal pumping frequency of the RF excited gas device, is built to normally provide to the device a voltage that is less than that required for ignition at such running frequency. To ignite the device, according to principles of the present invention, frequency of the RF power supply is changed for a short time, to make it the same, or nearly the same, as the resonant frequency of the RF excited device. The voltage applied to the gas discharge device is amplified by the high Q of the device when the applied voltage is at the resonant frequency of the device. This provides a greatly increased voltage to the device during the time that the RF source is at the device resonant frequency. Thus, the required higher starting voltage is provided simply by momentarily changing the RF source running frequency to the device resonant frequency. Actually, the arrangement enables a lower power exciting signal from the RF source to provide adequate starting voltage to the gas discharge device because the latter requires less starting power at resonance. Upon attaining ignition, the power supply frequency is shifted back to its running frequency to take advantage of the increased efficiency provided by the impedance matching circuit that is designed for optimum energy transfer at the running frequency.

Figure 1:
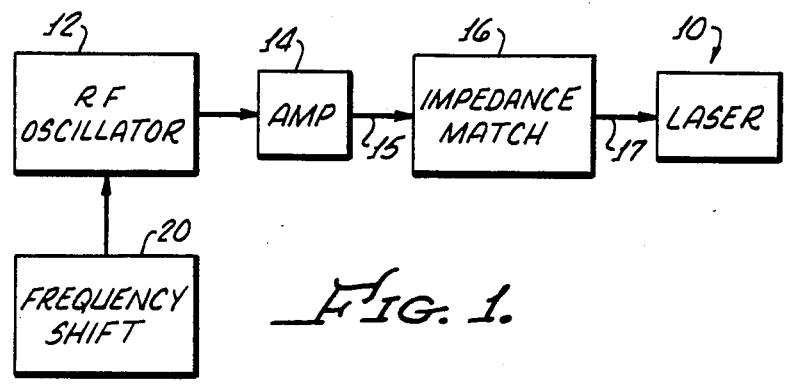
FIG. 1 is simplified functional block diagram of a laser and power supply embodying principles of the present invention.

As illustrated in FIG. 1, a conventional RF excited high pressure gas laser 10 is pumped or excited from an RF power supply which includes an RF oscillator 12 providing a radio frequency signal of relatively low power to a multistage power amplifier 14 that has a relatively high power output on leads 15 to an impedance matching circuit 16 which is coupled via leads 17 to the laser RF exciting electrodes (not shown). Impedance matching circuit 16 may be a conventional circuit arranged to provide for optimum efficiency of transfer of power at the normal pumping frequency of the laser, which is the normal running frequency of the RF oscillator 12. This normal running frequency may be above or below the resonant frequency of the laser cavity. In a particular embodiment that is presently preferred, the laser cavity has a resonant frequency of 41.3 MHz, whereas it is normally pumped at a frequency of 40.68 MHz, which is the normal running frequency of the output of the RF power supply. Impedance matching circuit 16 provides for most efficient transfer of energy to the laser at the running frequency.

In order to provide a momentary increased starting voltage for igniting the laser, and therefore to enable use of a power supply of less power, the normal running frequency of the RF oscillator 12 is momentarily shifted, by a frequency shifting circuit 20, to be at or substantially at the resonant frequency of the laser. As previously mentioned, the applied voltage, when at the laser resonant frequency, is greatly amplified by the high Q of the resonant circuit. Therefore, with the RF pumping frequency input at the laser resonant frequency, the laser experiences a sharply increased voltage which is sufficient to ignite the laser. After ignition, the oscillator frequency is shifted back to its normal running frequency, and efficient operation of the laser with the power supply of reduced power may continue.

Figure 2:
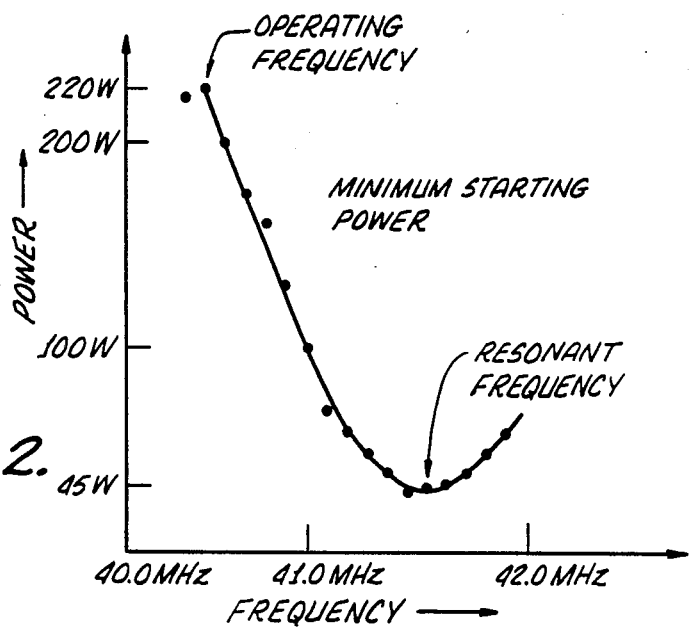
FIG. 2 is a graph depicting variation of laser starting power with frequency.

The greatly increased voltage applied to the laser when its pumping signal is momentarily shifted to the laser resonant frequency means that considerably less starting power is required for ignition of the laser. FIG. 2 is a graph of empirically derived data for a gas discharge laser having a resonant frequency of 41.3 MHz and optimized for a normal running frequency of 40.68 MHz. The curve of this graph depicts the minimum starting power required at various frequencies. The graph shows that, at the normal running frequency of 40.68 MHz, 220 watts of starting power is required, whereas at the resonant frequency of 41.3 MHz for this laser, a starting power of only 45 watts is required. This is a startling decrease in the required starting power. Because the required starting power is decreased to such a large extent, a substantially smaller, lighter, and less expensive power supply may be employed. Further, as the laser ages and composition of the lasing gas changes, required starting voltage increases. Therefore, in many prior art lasers without the use of the frequency shifting techniques of the present invention, the required starting voltage of an older laser may exceed available voltage at the operating frequency. By use of a momentary frequency shift toward circuit resonance to ignite the discharge, an adequate starting voltage will be available.

Figure 3:
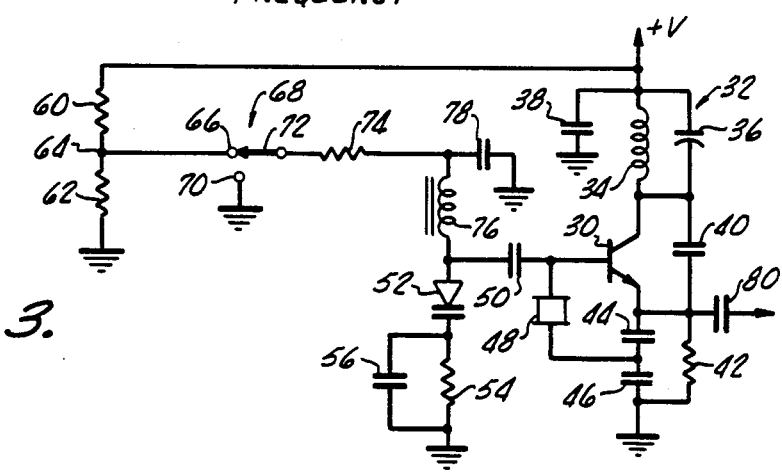
FIG. 3 is a circuit diagram of an RF oscillator incorporating momentary discrete frequency shifting.

It will be readily appreciated that many types of RF oscillators may be employed in the RF power supply, and many arrangements are well known for frequency shifts. Nevertheless, to illustrate principles of this invention there is described a presently preferred embodiment which employs a modified Colpitts oscillator. The oscillator has a frequency determining crystal of which the natural frequency is "pulled" or momentarily shifted by a small amount by means of a variable capacitance diode. As illustrated in FIG. 3, the RF oscillator is constructed around a transistor 30 having a tank circuit 32 comprising an inductor 34 and capacitor 36 connected in parallel between the transistor collector and a voltage source +V, which is isolated from the RF tank circuit 32 by means of a grounded capacitor 38. The transistor emitter is coupled to its collector by means of a capacitor 40 and connected to ground via a resistor 42, and a pair of series connected capacitors 44,46 which are connected in parallel with resistor 42. The transistor base and emitter are interconnected by the capacitor 44 in series with an oscillator frequency determining crystal 48, which has one side connected to ground via capacitor 46. The other side of the frequency determining crystal is connected to ground via an additional capacitor 50, series connected to a variable capacitance diode 52, and a parallel RC circuit comprised of a resistor 54, and a capacitor 56 which connect the diode to ground. A precision resistive voltage divider comprised of resistors 60,62, connected in series between the positive supply +V and ground, has its resistor junction 64 connected to a first terminal 66 of a momentary switch 68. Switch 68 includes a second terminal 70 connected to ground and a switch arm 72 connected via a series connected resistor 74 and a radio frequency choke coil 76 to the anode of variable capacitance diode 52 and also to ground via a capacitor 78.

Isolation of the radio frequency of the oscillator from the DC power supply is achieved by the RF choke 76 and capacitors 78 and 38. The tank circuit 32 is tuned to the natural frequency of crystal 48. By connecting across the crystal the several capacitors 46, 50 and 56, together with the variable capacitance diode 52, and varying the bias on the diode, effective natural frequency of the crystal can be momentarily changed. Change of effective natural frequency of the crystal is achieved by operation of switch 68, moving it momentarily from its connection with terminal 66, connected to the junction of the voltage divider, to connection with grounded terminal 70. In the illustrated position of the switch, precision voltage divider 60,62 biases variable capacitance diode 52 to a preset level, which establishes a precise capacitance (which may be 18 pf, in a presently preferred embodiment) across the crystal through the capacitors 46, 50 and 56. Output of the oscillator is taken from the transistor emitter via a capacitor 80 from which it is fed to the input of the first stage of the multistage power amplifier 14.

To start the laser the oscillator frequency is shifted. This is accomplished by grounding resistor 74 by momentary operation of switch 68 to connect arm 72 to terminal 70, thereby changing the capacitance across the crystal to a smaller value, such as, for example, 8 pf. Thus the grounding of resistor 74 through switch 68 changes the frequency of the oscillator output at capacitor 80. The running frequency of the oscillator, which is controlled by the crystal, is 40.68 MHz with the switch 68 in the position illustrated in FIG. 3. Upon operation of the switch to ground resistor 74, the oscillator frequency rises to the laser resonant frequency, 41.3 MHz. Preferably the switch 68 is a manually operated toggle switch or push button switch with a spring return so that the grounding of resistor 74 may be accomplished for a relatively short interval, namely a time between about 0.5 and 3 seconds, for example. At present it is preferred to accomplish laser ignition by shifting for a period of approximately 1 second, which is sufficient to attain ignition of the laser. As soon as the switch 68 returns to the position illustrated in FIG. 3, the bias voltage of divider 60,62 is returned to the variable capacitance diode 52 through resistor 74 and choke 76 and the oscillator frequency returns to 40.68 MHz, which is the natural frequency of the crystal 48.

In employing principles of the present invention it has been found that a power supply having the described frequency shifting ability was able to ignite discharge in lasers that could not be started with conventional power supplies. Thus the invention enables a laser RF power supply, which might not otherwise have sufficient starting power, to provide power sufficient for gas discharge laser starting merely by momentarily shifting the power supply frequency to or toward the laser resonant frequency. Because of the greatly increased voltage experienced by the laser when the power supply is at or nearly at laser resonant frequency, a much smaller power is effective for ignition (as illustrated in FIG. 2), and impedance matching circuit may be optimized for most efficient energy transfer during normal laser operation.

The switch 68 may be remotely or automatically controlled to provide the momentary grounding of resistor 74. Alternatively, other arrangements may be provided for momentarily pulling the frequency of crystal 46, such as, for example, different arrangements of switched or momentarily switchable capacitors connected to the crystal. Switchable or variable inductors can also be used to change frequency. Obviously other types of oscillators may be used, having other arrangements for temporarily shifting their output frequency. Although variable frequency oscillators, such as voltage controlled oscillators, may be employed, an oscillator having a nominally fixed frequency controlled by a crystal, for example, has much greater stability and is presently preferred.

The described apparatus and method provide an an effective reduction of required starting power in a circuit that is readily implemented with low power level components. Circuit elements required for frequency control and frequency shifting are smaller, lighter and less costly because the oscillator of the high output power RF source actually operates at very low power levels. For example, the oscillator may operate at about 0.5 watts, whereas the power supply may provide an output of from 50 to 300 watts in various versions. In fact, frequency shifting at power levels as high as 300 watts may be very difficult to accomplish with known circuit components. Further, circuit elements are less susceptible to temperature induced shift and have greater stability at lower powers.

The invention has been described in connection with the starting and operation of an RF excited high pressure gas laser. Nevertheless, it will be readily appreciated that principles of momentary frequency shifting toward device resonance for ignition may be readily applied to other RF excited gas devices, such as, for example, plasma etching, and ozone generating devices.

What is claimed is:

1. A method of operating an RF excited gas device having a resonant frequency comprising the steps of:
   generating an RF signal having a normal running frequency displaced from said resonant frequency,
   applying said RF signal to said gas device,
   starting operation of said gas device by shifting the normal running frequency of said RF signal toward said resonant frequency to a starting frequency, and
   shifting the frequency of said RF signal from said starting frequency back toward said normal running frequency after start of operation of said RF gas device.

2. The method of claim 1 wherein said step of generating an RF signal comprises providing an RF power source having an oscillator that determines frequency of the RF signal, and wherein said step of starting operation includes the step of momentarily changing the frequency of the oscillator.

3. The method of claim 2 wherein the oscillator includes a frequency determining element and wherein said step of changing the frequency of the oscillator comprises momentarily changing the effective frequency of said frequency determining element.

4. The method of claim 2 wherein said step of applying said RF signal comprises amplifying the output of the oscillator to increase its power, and feeding the amplified output to the laser through an impedance matching circuit.

5. A method of starting and operating a gas discharge laser having a resonant frequency and an operating pumping frequency displaced from said resonant frequency, said method comprising the steps of:
   generating an RF pumping signal having a running frequency substantially the same as said operating pumping frequency,
   applying said RF pumping signal to said laser,
   shifting the frequency of the RF pumping signal toward said resonant frequency to start the laser, and
   shifting the frequency of the RF pumping signal toward said running frequency after said shifting of the frequency of the RF pumping signal toward said resonant frequency.

6. The method of claim 5 wherein said step of applying said RF signal to said laser comprises the steps of amplifying said RF signal, matching the impedance of the amplified RF signal to the impedance of the laser at said operating pumping frequency, and wherein said first mentioned step of shifting comprises momentarily shifting the frequency of the RF pumping signal to a frequency substantially equal to said resonant frequency.

7. A starting system for an RF excited gas laser having a resonant frequency comprising:
   power source means for generating an RF laser pumping signal having a frequency displaced from said resonant frequency,
   means for applying said pumping signal to a laser to be started, and means for momentarily shifting the frequency of said pumping signal toward said resonant frequency, thereby increasing the voltage applied to said laser and igniting discharge thereof.

8. The system of claim 7 wherein said laser presents an input impedance to said pumping signal and wherein said power source means comprises an RF oscillator having a normal output signal at said natural running frequency, amplifier means for increasing the power of said oscillator output, impedance matching means connected between said amplifier and laser for matching the output impedance of the amplifier to the input impedance of the laser at said natural running frequency, said oscillator having frequency determining means, said means for momentarily shifting the frequency of said pumping signal comprising means for controlling said frequency determining means to change the frequency of the oscillator output signal to a frequency substantially equal to said laser resonant frequency.

9. The system of claim 8 wherein said oscillator frequency determining means comprises a frequency controlling crystal and wherein said means for controlling comprises means for changing the effective frequency of said crystal.

10. The system of claim 9 wherein said means for changing the effective frequency comprises a variable capacitance diode coupled to said crystal, means for applying a voltage to said diode and means for momentarily varying the voltage applied to said diode.

11. A method of igniting a gas laser of the type having a resonant frequency and which is excited during laser operation by application of an RF pumping signal at an operating frequency that is displaced from said resonant frequency, said method comprising the steps of:
shifting the frequency of said pumping signal from said operating frequency toward said resonant frequency, thereby increasing voltage applied to the laser and igniting the laser, and
shifting the frequency of said pumping signal back to said operating frequency after said laser is ignited.

12. The method of claim 11 including the steps of generating said pumping signal as the output of a low power oscillator, amplifying said low power output for application to the laser, said step of shifting comprising momentarily changing the frequency of said oscillator.

13. In combination with a gas laser having a resonant frequency and an operating frequency displaced from said resonant frequency, an improved RF power supply comprising:
oscillator means for generating an RF output signal having a frequency substantially the same as said operating frequency,
an amplifier connected to receive and amplify said output signal and having a high power output,
an impedance matching circuit having an input connected to receive said high power output and having an RF exciting signal connected to said laser for exciting said laser during operation thereof, and
means for momentarily shifting frequency of said RF output signal toward said resonant frequency, thereby providing to said laser an RF exciting signal of increased voltage to start operation of said laser.

14. The combination of claim 13 wherein said oscillator means includes a frequency determining circuit component having a first impedance that maintains said RF output signal at said operating frequency, and wherein said means for momentarily shifting comprises means for changing said first impedance to a different impedance to start operation of the laser and for changing said different impedance back to said first impedance after said laser starts operation.

15. The combination of claim 14 wherein said frequency determining circuit component comprises a frequency controlling crystal, and wherein said means for shifting includes variable capacitance means having a capacitance value and connected to said crystal, and switching means for changing the capacitance value of said variable capacitance means.

16. The combination of claim 15 wherein said variable capacitance means comprises a variable capacitance diode coupled to said crystal, and wherein said switching means comprises means for applying one or the other of two voltages to said diode.

* * * * *